May 6, 1958  C. H. O. BERG  2,833,838
APPARATUS AND PROCESS FOR HIGH TEMPERATURE CONVERSIONS
Filed July 19, 1954
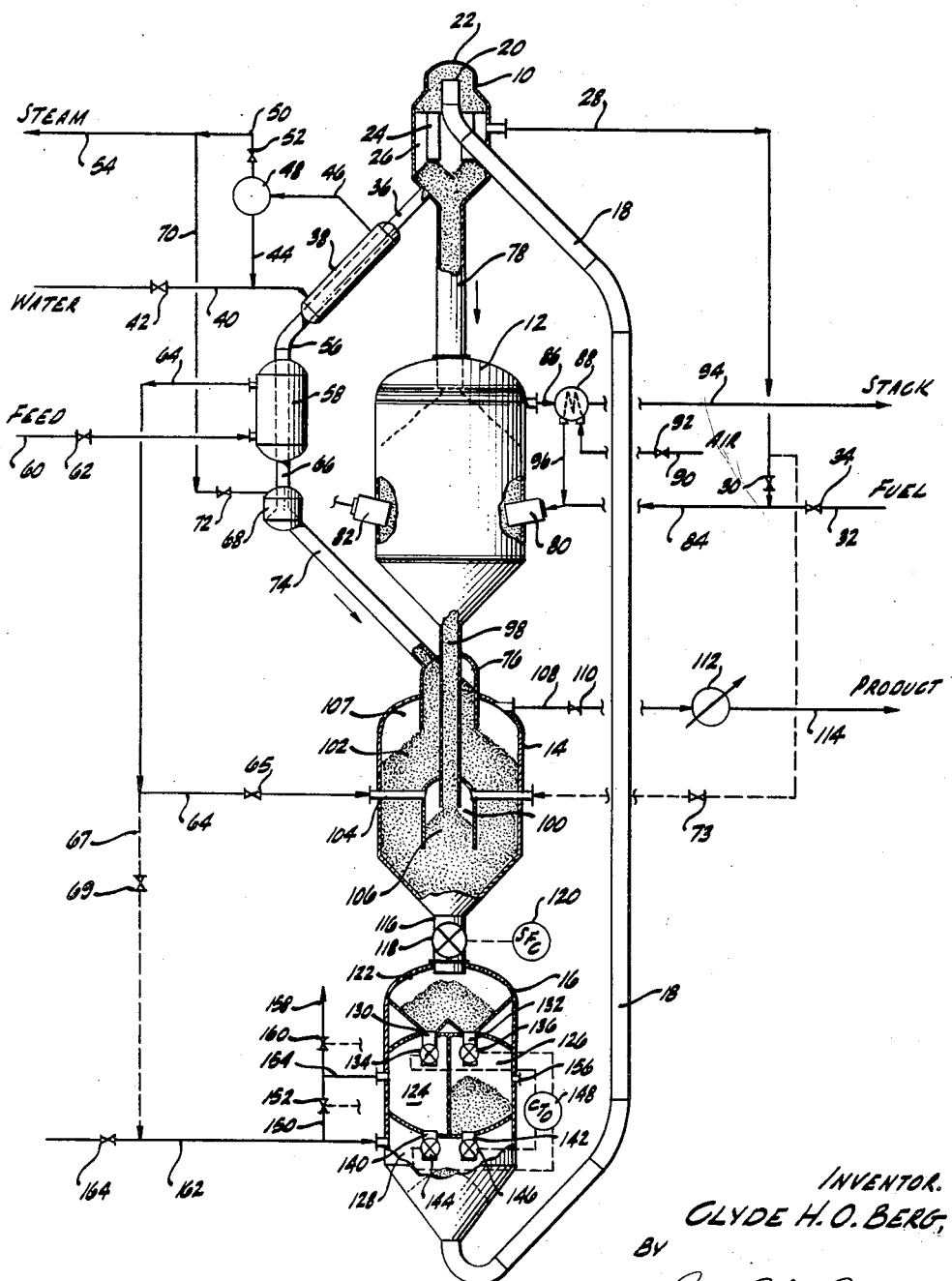
INVENTOR.
CLYDE H. O. BERG,
BY
AGENT.

2,833,838
APPARATUS AND PROCESS FOR HIGH TEMPERATURE CONVERSIONS

Clyde H. O. Berg, Long Beach, Calif., assignor to Union Oil Company of California, Los Angeles, Calif., a corporation of California Application July 19, 1954, Serial No. 444,281

15 Claims. (Cl. 260—679)

This invention relates to an improved process and apparatus for conducting high temperature reactions in which unusually high thermal efficiencies are obtained and in particular this invention is directed to an improved process and apparatus for the production of acetylene by thermal cracking through contact with a continuously recirculating bed of solid granular contact material.

In carrying out high temperature conversions, such as the production of acetylene, butadiene, ethylene, and other unsaturated hydrocarbons, and also in other well-known high temperature reactions, it is essential to secure the most rapid heating of the reactants possible, to maintain control over the short reaction time at such superatmospheric temperature, to quench the reaction products to a temperature sufficiently low to terminate the desired reaction and prevent unwanted side reactions from occurring, and to accomplish the foregoing at the highest thermal efficiency possible. By thermal efficiency is meant the ratio of useful utilization of heat to total heat input.

The temperatures involved in the usual high temperature conversions to which the present invention is directed may range from somewhat below 1000° F. to temperatures as high or higher than about 3500° F. In the thermal cracking of hydrocarbons to produce acetylene, the preferable temperatures range as high as 2500° F., and at these temperatures in the conventional processes numerous operational and structural problems have been encountered in the past which remain unsolved.

The present disclosure is made primarily with respect to the thermal cracking of light hydrocarbons to produce acetylene, but it is to be understood that the process of this invention and the apparatus herein disclosed may be readily adapted and used generally in the carrying out of high temperature reactions by those skilled in the art based upon this description.

The prior art processes for the production of acetylene fall into approximately 5 groups and which differ from each other in their fundamental nature. Each has its advantages and disadvantages and none combines all the advantages with none of the disadvantages as does the method and apparatus of the present invention.

The carbide process, by which the majority of acetylene produced in the United States is made, involves the electric arc reduction of calcium carbonate with coke at about 3800° F. to produce calcium carbide which is reacted with water to produce acetylene. The electric power consumption is about 4.8 kilowatt hours per pound of acetylene and the process requires adjacent sources of coke, lime and cheap electric power, requirements which are not easily met.

The second group includes processes which are essentially electric in nature and employ electric arcs or silent electrical discharges to heat hydrocarbons such as natural gas to elevated temperatures whereby acetylene is formed by thermal cracking. The electric power requirement is even greater than in the carbide process and runs 6–7 kilowatt hours per pound of acetylene.

The third process involves partial oxidation of the hydrocarbon feed with oxygen and requires an expensive oxygen plant although the electric power requirement is relatively low. The partial oxidation is conducted at temperatures of the order of 2500° F. and requires an exceedingly complex tubular reactor in which small diameter tubes and high reactant gas velocities are employed to prevent flash backs.

The fourth group of processes are similar to those in the group immediately preceding except that they involve partial oxidation with air. The oxygen plant is unnecessary but the product gas is highly diluted with nitrogen and contains of the order of 3.5% acetylene compared with from 8 to 10% for the oxygen oxidation process.

The fifth group of processes, of which the present invention is a member, involves regenerative thermal cracking of light hydrocarbon gases to produce acetylene. The most successful process to date appears to be the Wulff process which involves the discontinuous regenerative cracking of propane and lower molecular weight hydrocarbons in a pair of stationary refractory checkerworks maintained at temperatures between about 2200° F. and about 2600° F. One checkerwork is being heated while the other is cracking hydrocarbon feed. The checkerwork reactor is necessarily fairly massive and in order to maintain the requisite short contact times, the Wulff furnace is operated at approximately 0.5 atmospheres absolute pressure and employs a 5 to 1 dilution of the furnace feed with steam. The disadvantages of subatmospheric pressure operation are obvious as is the disadvantage of employing 5 mols of steam per mol of feed. The thermal efficiency of such thermal cracking processes is about 50 to 60%.

The present invention has successfully overcome the disadvantages of the processes outlined briefly above. It permits the use of inexpensive raw material, the maintenance of optimum reaction temperatures and pressures at or above atmospheric if desired, it is free of steam or other gas dilution problems, it provides for an adjustable residence time in the reactor, it does not require a separate source of oxygen or great quantities of electric power, it does not require the maintenance of a vacuum, it operates at unusually high heat transfer coefficients and permits the substantially complete recovery of all heat employed, it produces an effluent which is undiluted with steam or nitrogen and has a very high acetylene concentration, it is operated continuously, and it utilizes an apparatus which is simple in construction.

It is accordingly an object of the present invention to provide an improved process for effecting high temperature reactions at exceedingly high thermal efficiencies of the order of 90%.

It is a more specific object of the present invention to provide a continuous, simple, and flexible process for the thermal cracking of light hydrocarbons for the production of acetylene.

It is also an object of the present invention to provide an improved apparatus for accomplishing the foregoing objects.

Other objects and advantages of the present invention will become apparent to those skilled in the art as the description thereof proceeds.

Briefly, the present invention comprises a process for heating fluid streams to very high temperatures for controlled length of time to effect heat treating or chemical conversion thereof and following the conversion the hot effluent gases are quenched very rapidly to prevent product decomposition or undesired side reactions from taking place. The process involves a continuous recirculating stream of granular solid contact material consisting of refractory granular solids. These solids are conveyed from the bottom to the top of the apparatus of this invention and passed downwardly therethrough successively through the various chambers and zones by gravity as a downwardly moving compact bed having a bulk density substantially the same as that of the granular solids when at rest.

The granular solids are lifted or conveyed in the process of this invention in the form of an upwardly moving solids bed having a density substantially equal to the downwardly moving bed of solids employed in the reaction zone. The bulk density of the upwardly moving solids bed is substantially the same as the static bulk density of the granular solids when at rest. Granular solids are conveyed in this form through an elongated conveyance conduit in the presence of a relatively high pressure gradient generated by the concurrent flow through the conveyance zone of a conveyance fluid which may be gaseous or liquid, but in the present process is preferably a gas or vapor. The dense or compact solids are conveyed by submerging the inlet opening of the conveyance zone in a mass of granular solids to be conveyed, by maintaining throughout the length of the conveyance zone a pressure gradient $$\frac{dp}{dl}$$

in pounds per square foot per foot which is greater than $$\rho_s \cos \theta$$

(wherein $\rho_s$ is the static bulk density of the granular solids in pounds per cubic foot and $\theta$ is the angular deviation of the conveyance direction measured from a vertical upward reference axis) and by applying a force against the granular solids discharging from the conveyance zone outlet. The discharge of solids is restricted by the thrust force application without any substantial restriction of the conveyance fluid flow at this point and the fluidization of the solids in the conveyance fluid is prevented. As subsequently shown, the thrust force application is perhaps most easily accomplished by discharging the solids from the conveyance zone against one of the walls of a closed solids-receiving chamber which is kept full of a moving bed of discharged solids. The conveyed solids are removed by gravity from an outlet from the chamber at a rate controlled by a valve or other solids flow control means downstream from the conveyance conduit solids outlet.

In the process of this invention, one such compact solids conveyance step is employed in which the granular solids are lifted from the bottom of the apparatus to the top concurrently with a flow of either fuel or feed vapor. Since the solids stream leaving the quenching chamber is warm, the fuel or feed gas is given a moderate preheating during the conveyance. The preheated gas is disengaged from the conveyed solids at the top of the conveyance and is either introduced into the heating zone or into the reaction zone. The conveyed granular solids are then divided into two separate streams. A primary solids stream is introduced directly into the top of the heating zone wherein it is countercurrently contacted by flue gases and heated to the desired maximum solids temperature necessary for the particular reaction being conducted. The thus heated solids then pass from the heating zone directly into the reaction zone wherein they are contacted by the preheated feed to effect the desired reaction. A secondary stream is passed downwardly through one or more heat exchange zones including a steam generation zone in which sufficient steam to satisfy the process requirements is produced, then through a feed preheating zone, and then into the quench chamber. Immediately below the reaction zone the primary granular solids stream therefrom is combined with the secondary granular solids stream in the quenching zone to form a mixed stream. The mixed solids stream passes into a feeder zone hereinafter more fully detailed and in which the fluid present in the interstices of the granular solids is raised in pressure by the injection of additional fluid in a sealable chamber, and then the solids are injected into the solids conveyance and cooling conduit and conveyed therethrough under a substantial differential pressure and cooled therein by direct heat exchange with the conveyance fluid.

In the process of this invention the feed hydrocarbon and the air employed for heating enter the process at temperatures below about 100° F., and the quenched product effluent and the flue gas discharged to the atmosphere are removed from the process at temperatures of the order of 300° F. The thermal efficiency of the process of this invention is thus exceedingly high and has been determined to approximate 90%.

The present invention will be more clearly understood by reference to the accompanying drawing which illustrates an elevation view in partial cross section of the apparatus of this invention and includes a schematic flow diagram of the process. The description of the drawing is conducted in the form of a practical example of the process of this invention as applied to the thermal cracking of propane to produce acetylene at high temperatures and at controlled short contact reaction times. It should be understood, however, that the process and apparatus described may be used generally as a tool for conducting superatmospheric temperature reactions requiring short reaction times and rapid product quenching in general.

Referring now more particularly to the drawing, the apparatus consists essentially of solids-fluid separator 10, heater 12, reaction and quenching chamber 14, and solids pressuring feeder 16. The granular solids are removed from feeder 16 and conveyed upwardly to separator 10 through solids conveyance and cooling conduit 18 by means of a concurrent flow of a conveyance fluid passing at a rate sufficient to generate a substantial pressure differential and overcome opposing forces of gravity and friction. The conveyance fluid employed is preferably a fluid used in the process itself, such as fuel or reactant, and is given a substantial degree of preheat while conveying and cooling the solids. The granular solids discharge from upper outlet opening 20 of lift line 18 against the roof 22 of separator 10 whereby a thrust force is applied to the solids and the solids are maintained during conveyance at a bulk density substantially equal to the static bulk density of the solids when at rest. The thus conveyed granular material, which in the present example is granular coke recirculated at a total rate of 11 tons per hour, flows downwardly through dependent tubes 24 which form a disengaging space 26. The conveyance fluid, in the present example, is natural gas fuel and is removed therefrom through line 28 at a rate of 2.7 MSCF. per hour controlled by valve 30. The preheated fuel is combined with additional fuel if desired flowing through line 32 at a rate controlled by valve 34 and is introduced into heater 12 as described below. When the propane or other reactant feed is employed as the conveyance fluid, valve 65 may be at least partly closed and at least part of the partially preheated fluid is passed through line 67 with valve 69 open into lower solids surge zone 128 described below and receives further preheat in passing concurrently with the warm mixed stream of coke upwardly through solids conveyance and cooling conduit 18. The preheated reactant then passes via line 28 with valve 30 closed and through line 71 with valve 73 open into inlet 75 to the reaction zone 100.

The granular coke is divided into a primary and secondary stream in the bottom of separator 10.

The primary coke stream is passed downwardly by gravity from separator 10 through transfer line 78 at a rate of 7.5 tons per hour into the top of solids heater 12. Heater chamber 12 is provided with one or more fired heaters 80 and 82 disposed peripherally around the lower part of heater chamber 12. These units are preferably of the surface combustion type and adapted to the combustion of fuel gas and air. They are fired with preheated fuel gas flowing through line 84 introduced at a rate of 9.0 MSCF. per hour. The primary coke stream is preheated in heater 12 to a temperature of about 3300° F. by countercurrent contact of the burning fuel and air with the downflowing primary coke. The flue gases are removed through line 86 and passed through air heater 88 in indirect heat exchange relation with air through line 90 at a rate of 120 MSCF. per hour controlled by valve 92. Herein the flue gases are cooled to a temperature of 610° F. and discharged to a stack through line 94. The preheated air at a temperature of 2000° F. is passed through line 96 and is combined with the preheated fuel gas and burned. The hot primary coke stream passes downwardly through transfer line 98 indirectly through primary solids header 76 and is discharged directly into reaction zone 100.

The secondary coke stream flows at a rate of 3.5 tons per hour and passes downwardly through transfer line 36 through steam generator 38 wherein the coke is cooled to a temperature of about 1500° F. in indirect heat exchange with water. The water to be vaporized is introduced through line 40 at a rate of 210 gallons per hour controlled by valve 42, is combined with non-vaporized water flowing through line 44, and passes into steam generator 38. The generated steam is removed therefrom through line 46 and is introduced into steam separator 48 in which the unvaporized water is separated. Dry steam is removed therefrom through line 50 at a rate of 1750 pounds per hour controlled by valve 52 and provides the whole steam requirements of the process and permits some excess steam to be produced through line 54.

The cooled secondary granular solids stream flows through transfer line 56 into feed vaporizer and preheater 58. Herein the granular coke is further cooled to a temperature of about 425° F. in indirect heat exchange with propane feed. The feed material is introduced through line 60 at a rate of 336 gallons per hour controlled by valve 62. The propane is preheated and vaporized in vaporizer 58 and is removed therefrom at a temperature of about 1400° F. through line 64 controlled by valve 65 and is introduced thereby into the reaction zone hereinafter detailed.

The cold secondary coke stream passes through line 66 into sealing zone 68. A portion of the steam produced in the process as described above passes through line 70 at a rate controlled by valve 72 as a seal gas into zone 68. This seal stream splits, one part passing upwardly countercurrent to the descending secondary coke stream to prevent downflow of fuel gas therethrough and the second part passes downwardly concurrently with the cold secondary coke stream through transfer line 74 into solids header 76 located at the top of reaction and quenching chamber 14.

The cold secondary coke stream passes downwardly from header 76 surrounding reaction zone 100 with a cold coke bed 102. The preheated feed passing through line 64 as described above is introduced through conduit 104 into the upper portion of reaction zone 100, passes downwardly and through in concurrent contact with the hot primary solids bed 106 maintained at an average temperature of 2800° F. wherein the acetylene-producing reaction takes place. The reaction product gases pass downwardly to the lower open end of reaction zone 100 at an intermediate point in the quenching zone, flow laterally into the annular bed of cold secondary coke 102 in the quenching zone surrounding the reaction zone, and pass upwardly therethrough from this low point countercurrent to the cold secondary or quench stream of coke in which the converted gases are rapidly cooled to a temperature of about 425° F. The quenched effluent is removed from effluent disengaging zone 107 at a rate of 56 MSCF. per hour through line 108 at a rate controlled by valve 110 from the top of reaction and quench vessel 14. The quenched effluent is further cooled in cooler 112 and is sent through line 114 to storage or further processing facilities discussed below.

The combined primary and secondary coke streams accumulate at the bottom of reaction and quench vessel 14 and are removed therefrom as a warm mixed stream through transfer line 116 at a total rate of 11 tons per hour controlled by valve 118 in accordance with solids flow controller instrument 120. The combined coke stream is introduced continuously into upper surge chamber 122 of solids pressuring vessel 116. Immediately below the upper surge chamber 122 are intermediate pressuring chambers 124 and 126. The lowermost part of vessel 16 contains lower surge or induction chamber 128 which discharges at its lower end into the solids conveyance and cooling conduit 18 discussed above.

The upper solids surge chamber 122 opens respectively into pressuring chambers 124 126 through lines 130 and 132 controlled respectively by motor valves 134 and 136. The intermediate pressuring chambers 124 and 126 further communicate respectively with lower solids surge chamber 128 through lines 140 and 142 controlled respectively by motor valves 144 and 146. Cycle timer operator instrument 148 is connected to and adapted to actuate motor valves 134, 136, 144, and 146 in sequence so as to fill them from upper solids surge chamber 122 and empty them into lower solids surge chamber 128 in rotation or in a staggered sequence so as to maintain a substantially constant introduction of coke from chamber 122 into chamber 128.

The major parts of the apparatus of this invention, e. g. chambers 10, 12, and 14 are operated at a relatively low superatmospheric pressure of 14 p. s. i. g. which is also the pressure at the outlet of conveyance conduit 18. Because of the relatively high pressure drop of the conveyance of 26 p. s. i., solids pressuring vessel 16 increases the pressure of the fluids associated with the recirculating coke from the main operating pressure to a higher pressure of 40 p. s. i. g. This is accomplished by introducing a portion of the conveyance gas, which is discussed below, through line 150 at intervals controlled by motor valve 152 and through header 154 into pressuring chamber 124. A motor valve similar to valve 152 and header 154 are provided pressuring chamber 126 at its inlet 156 shown but not illustrated for reasons of simplicity. With the valved inlet and outlet of pressuring chamber 124 closed, cycle timer operator 148 opens valve 152 and raises the pressure of chamber 124, after the solids have been introduced, to a pressure of 40 p. s. i. g. Then valve 152 is closed and valve 144 is opened to discharge the pressured solids into lower solids surge chamber 128. After chamber 124 is thus emptied, it is depressured to 14.0 p. s. i. g. through header 154 and through line 158 by opening of motor valve 160 which is also controlled by cycle timer 148. After the depressuring step, valve 134 is opened to admit additional solids.

Both of the intermediate pressuring vessels 124 and 126 are operated in this sequence but in alternation to provide a substantially continuous stream of pressured solids flow into chamber 128 for conveyance. Although only two intermediate pressuring vessels are illustrated, a single vessel could be used with an intermittent transfer of pressured solids, or any greater number can be operated in sequence to give the substantially continuous stream of pressured solids.

In the present example, the conveyance fluid is fuel gas which is introduced through line 162 at a rate of 2.7 MSCF. per hour and at 40 p. s. i. g. controlled by valve 164. This gas enters lower surge chamber 128 as the highest pressure point in the system, it flows downwardly concurrently with the entire coke stream from the bottom of solids pressuring vessel 16 and upwardly through conveyance conduit 18 for discharge into the upper part of separator chamber 10 from which the primary and secondary solids streams originate thus completing the granular solids cycle.

In the process of the present example, the effluent gas is produced from the apparatus of this invention at a rate of 56 MSCF. per hour having the following composition:

| Component: | Mol percent |
|---|---|
| Hydrogen | 51.5 |
| CO | 8.4 |
| Methane | 16.9 |
| $CO_2$ | 1.2 |
| Acetylene | 14.3 |
| Ethylene | 6.3 |
| Ethane | 0.1 |
| $C_3+$ | 1.3 |
| | 100.0 |

As can be seen from the foregoing example the process of the present invention is capable of producing an effluent containing acetylene in an amount corresponding to an unusually high yield based upon the hydrocarbon feed reacted. In this example the yield amounts to 26 mol percent. The effluent acetylene concentration is high due to the fact that no dilution by atmospheric nitrogen or steam or other inert gases is involved in the process. The acetylene concentration is usually between about 9 mol percent and about 20 mol percent and the concentration in the foregoing example as listed in the table above is typical.

As applied to the production of acetylene, the present invention may be employed using any low molecular weight hydrocarbon having less than about 5 carbon atoms per molecule, such as methane, ethane, propane, or mixtures thereof such as natural gas as the reactant feed. The temperature of the primary solids stream introduced into the reaction zone may be between 2000° F. and 3500° F. depending upon the nature of the reactant feed. The contact time, or the reactant feed transit time through the bed of solids in the reaction zone, is preferably between about 0.0005 and 0.05 second. The reactant preheat temperature is preferably the maximum which can be attained without premature decomposition of the reactant, and will vary between about 1000° F. and about 1500° F. with different hydrocarbon feed materials. The temperature of the secondary solids stream introduced into the quenching zones is below about 800° F. and preferably is below about 500° F.

Because of the relatively high concentration of acetylene, the effluent fractionation step of this process to recover the acetylene is made considerably simpler than in the conventional processes discussed above. An appropriate fractionation procedure involves a preliminary cooling of the quenched effluent to temperatures approaching that of the atmosphere followed by separation of any condensed material. The uncondensed portion is then contacted with a moving bed of solid granular adsorbent such as activated charcoal in which the ratio of adsorbent to the gas to be separated is controlled so as to adsorb the $C_2$ and higher molecular weight hydrocarbons and to leave methane and lower molecular weight gases substantially unadsorbed. The unadsorbed gases contain considerable quantities of methane and hydrogen which may be recirculated for use as fuel in the process. An intermediate $C_2$ hydrocarbon fraction is rectified from the rich adsorbent by contacting it with a reflux gas containing more readily adsorbable constituents thereby desorbing a side cut fraction containing substantially all of the acetylene product together with ethylene. The rectified adsorbent is then heated and stripped of $C_3$ and any higher molecular weight hydrocarbons as a rich gas which may then be recirculated as feed or fuel in the process of the present invention. Preferably these materials are recirculated together with fresh feed for further reaction.

The intermediate acetylene containing fraction is treated by solvent extraction or absorption to separate the acetylene from ethylene. The acetylene is ordinarily found in the extract or the rich solvent and is recovered therefrom in substantially pure form by any of the conventional solvent or extract stripping procedures. The unabsorbed material constitutes principally ethylene which may be produced as a separate product of the process if desired.

It is to be pointed out that the above-described process and apparatus, while being exceedingly well adapted to the production of acetylene by thermally cracking light hydrocarbons, also has general utility in the conducting of relatively fast and high temperature reactions to produce such products as ethylene, butadiene, and other hydrocarbon products, to the thermal cracking of heavier petroleum hydrocarbon fractions at high temperatures by direct contact with highly heated solid materials such as, for example, in contact coking of heavy oils, shale oil coking or cracking, and the like. Such high temperature short contact time reactions are well-known and will occur to those skilled in the art from the above description. Several examples of typical processes are given below.

*Example II*

A straight-run naphthenic gasoline having a boiling range of from 170° F.–220° F., flowing at a rate of 4.62 gallons per hour, is preheated and vaporized and introduced into the reaction zone to contact granular coke at temperatures ranging from 2200° F.–3400° F. A reaction time of 0.024 second is employed. The effluent is quenched from an average reaction temperature of about 1500° F. to temperatures below about 850° F. and is produced from the system at a rate of about 1210 s. c. f. per hour. The product gas contains 4.17% by volume of butadiene.

*Example III*

In the production of ethylene, gaseous ethane of about 95% purity is introduced at a rate of 2820 s. c. f. per hour into the reaction zone to contact therein a moving bed of granular alumina previously heated to a temperature of 1950° F. The contact time is maintained at 0.01 second and the effluent gases are quenched through contact with the secondary stream of cold granular alumina to temperatures below about 400° F. The product gas contains 37% by volume of ethylene and 11% by volume of unconverted ethane. The ethane conversion to ethylene amounts to about 86%.

*Example IV*

A heavy fuel oil having an A. P. I. gravity of 12° is preheated to a temperature of 475° F. and is introduced at a rate of 8 gallons per hour into the reaction zone to contact a recirculating stream of equilibrium coke which has been previously heated to a temperature of about 1000° F. A contact time of about 2 seconds is employed and the effluent coker distillate is quenched to a temperature of about 850° F. by countercurrent contact with the secondary stream of cold coke in the quenching zone. The quenched effluent is removed and condensed giving a liquid yield of about 87%.

The foregoing examples illustrate the general utility of the process and apparatus of this invention in the effecting of various relatively high temperature reactions in which short contact times are beneficial.

In the apparatus of the present invention it is preferred that the main high temperature reactor be provided with a water jacket and be constructed of alloy steel to protect it from the high temperatures involved. The transfer lines through which highly heated granular solids are conveyed are also preferably constructed of such alloy steel, and may be internally insulated through the use of a smooth ceramic lining or the like and finned externally to assist in protecting the tube and vessel walls from adverse temperature effects at the points in the apparatus where the temperatures are highest. The remaining portions of the apparatus may be satisfactorily constructed from mild steel.

The granular solid contact material employed in the process of this invention may be naturally occurring or specially manufactured refractory materials. The solid contact material may be in the form of fragments or granules which have been screened to provide a fairly uniform mesh size range and a preferred form of the contact material comprises semispherical manufactured refractories presently commercially available. A partial list of materials which may be employed include magnesium oxide, zirconium oxide, porcelain, or other ceramics, mullite, granular coke preferably produced by contact coking, metal balls such as those of high melting point metals, stainless steel and other temperature resistant alloys, the various refractory oxides such as those of aluminum, calcium, magnesium, zirconium and the like, the carbides including those of silicon and tungsten, granular quartz, graphitic materials of the well-known types, treated temperature stable clays, and in general any refractory granular material capable of withstanding the particular extreme temperature employed in a given process to which the principles of the present invention are applied.

The mesh size range of granular solids suitable for use in the process range from a minimum of about 40 mesh. Granular solids ranging from ⅛ inch to 2 inches average diameter may be employed and satisfactory mesh range lies between about ⅜ inch and about ¾ inch average diameter.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for conducting high temperature reactions at very short contact times of controlled duration which comprises establishing a reaction zone surrounded by and communicating at its lower open end with an intermediate point in a quenching zone, passing a primary stream of hot granular solids downwardly by gravity as a moving bed indirectly through said quenching zone and directly into said reaction zone and then from its lower open end directly into said quenching zone, passing a secondary stream of cold granular solids downwardly by gravity as a moving bed entirely around said reaction zone through said quenching zone, passing said solids as a mixed warm stream from the bottom thereof into a solids pressure feeding zone, raising the pressure of fluids in the interstices of said warm solids therein to a pressure substantially above that of said reaction and quenching zones, passing the thus pressured solids through an elongated solids conveyance and cooling zone as an upwardly moving bed concurrently with a conveyance fluid to cool the solids and heat the fluid, applying a force against a mass of solids discharging at the outlet of said solids conveyance and cooling zone to maintain said solids therein as a moving mass having substantially the solids' static bulk density, passing a primary stream of said solids downwardly through a heating zone to form said primary stream of hot solids, passing a secondary stream of said solids downwardly through a cooling zone to form said secondary stream of cold solids, passing a reactant fluid into direct concurrent contact with said primary stream of hot solids to react said fluid in said reaction zone wherefrom it flows directly into said quenching zone and flows therethrough countercurrent to said secondary solids stream to stop said reaction and removing a quenched effluent from the top of said quenching zone.

2. A process according to claim 1 in combination with the step of preheating said reactant fluid prior to introducing it into said reaction zone by passing it countercurrently in indirect heat exchange relation with said secondary stream of solids to form a partially preheated reactant.

3. A process according to claim 2 in combination with the steps of supplying said reactant fluid to the process at a relatively high pressure substantially greater than that of said reaction zone and further preheating said reactant fluid by passing said partially preheated reactant fluid from said pressure concurrently with said warm mixed solids through said solids conveyance and cooling zone as said conveyance fluid to a relatively low pressure so as to convey said solids and to form a preheated reactant fluid for introduction in said reaction zone.

4. A process according to claim 1 in combination with the steps of supplying a fuel gas for said heating zone at a relatively high pressure substantially greater than that of said heating zone, passing said fuel from said relatively high pressure as a conveyance fluid concurrently with said warm mixed solids in said solids conveyance and cooling zone to a relatively low pressure forming a preheated fuel, and introducing said preheated fuel into said heating zone for combustion therein.

5. A process according to claim 1 wherein the pressure of fluids in the interstices of said mixed stream of solids is increased in said solids pressure feeding zone by passing said solids substantially continuously into an upper solids surge zone maintained substantially at the quenching zone pressure, passing solids intermittently therefrom in rotation into each of a plurality of solids pressuring zones, introducing a fluid under pressure into each of said pressuring zones after mechanically sealing its solids inlet and outlet and after said solids have been introduced thereinto to raise the pressure therein to a substantially higher value, then opening the solids outlet and discharging the thus pressured solids from each of said pressuring zones in rotation into a lower solids surge zone from which said pressured solids are substantially continuously removed and which is maintained at a pressure substantially higher than that of said reaction and quenching zones, then depressuring each of said plurality of pressuring zones to receive additional solids from said upper solids surge zone, and filling, pressuring, emptying, and depressuring each of said pressuring zones in rotation to maintain a substantially continuous flow of said mixed stream of solids from said quenching zone into said solids conveyance and cooling zone.

6. A process for the conversion of hydrocarbons in the presence of a moving bed of granular solids contact material at high temperature and at short controlled contact times which comprises passing a primary stream of hot solids as a moving bed downwardly by gravity indirectly through the upper part of said quenching zone and into and directly through a reaction zone completely surrounded by a quenching zone and into the lower part of said quenching zone, passing a secondary stream of cold solids as a moving bed downwardly by gravity into the top of said quenching zone and downwardly entirely surrounding said reaction zone into combination with solids discharged from the bottom thereof forming a warm mixed solids stream in the lower portion of said quenching zone passing a preheated reactant hydrocarbon feed into and downwardly concurrently with said primary solids stream in said reaction zone for reaction therein forming a reaction product which flows therefrom downwardly and radially outward from the lower open end of said reaction zone directly into a countercurrent contact with said secondary stream of cold solids in said quenching zone to quench said reaction product, removing the quenched product from the top of said quenching zone, passing the warm mixed solids stream therefrom continuously at a substantially constant rate into an upper solids surge zone, passing said mixed solids intermittently therefrom in rotation into each of a plurality of solids pressuring zones, raising the pressure of fluids in the interstices of solids therein by the injection of fluid under pressure into each of said pressuring zones after mechanically sealing the solids inlet and outlet thereof, passing the thus pressured solids in rotation from each of said pressuring zones intermittently into a lower solids surge zone, passing said solids therefrom continuously at a substantially constant rate as an upwardly moving bed of solids through an elongated solids conveyance and cooling zone concurrently with a conveyance fluid to be heated, applying a force against the solids discharging from the outlet of said conveyance and cooling zone to maintain said solids moving therethrough as a mass having substantially the solids' static bulk density, disengaging the heated conveyance fluid at a relatively low pressure from the cooled conveyed solids, dividing said solids into a primary and a secondary solids stream, passing said primary solids stream through a heating zone to form said primary stream of hot solids, introducing said hot solids into said reaction zone, passing said secondary solids stream through at least one cooling zone to form said secondary stream of cold solids, and introducing said cold solids into said quenching zone.

7. A process according to claim 6 wherein said cooling zone comprises a reactant feed preheating zone through which said secondary solids stream passes in indirect heat exchange relation with said reactant fluid forming a partially preheated reactant for introduction into said reaction zone.

8. A process according to claim 7 in combination with the step of passing at least part of said partially preheated reactant at a pressure substantially greater than that of said reaction zone into and through said solids conveyance and cooling zone as said conveyance and cooling fluid to form said preheated reactant having a pressure substantially equal to the reaction zone pressure, and introducing said preheated reactant into said reaction zone.

9. A process according to claim 6 in combination with the steps of introducing a gaseous fuel as said conveyance and cooling fluid at a pressure substantially greater than the pressure in said heating zone into and through said solids conveyance and cooling zone forming a preheated fuel at a pressure substantially equal to the pressure of said heating zone, and introducing said preheated fuel into said heating zone for combustion therein.

10. A process according to claim 6 wherein said hydrocarbon feed comprises a low molecular weight hydrocarbon having less than about 5 carbon atoms per molecule, in combination with the steps of controlling the temperature of said primary solids stream entering said reaction zone to between about 2000° F. and 3500° F., controlling the contact time of said feed in said reaction zone to between about 0.0005 and about 0.05 second, controlling the temperature of said preheated hydrocarbon reactant to between about 1000° F. and about 1500° F. but insufficient to cause premature reaction, and controlling the temperature of said secondary stream of cold solids introduced into said quenching zone to below about 800° F., and wherein the effluent from said quenching zone is an acetylene-containing gas.

11. An apparatus for contacting a fluid with high temperature granular solid contact materials at short contact times which comprises a reaction chamber having a solids and fluid outlet opening at the lower open end thereof, an inlet for reactant fluids opening into the top thereof, a quenching chamber completely surrounding said reaction chamber in solids and reaction chamber effluent receiving relation therewith, an outlet for solids from the bottom of said quenching chamber, an outlet from the top thereof for the effluent fluids, a mechanically sealable solids pressuring means connected in solids receiving relation to the bottom of said quenching chamber and adapted to increase the pressure of fluids in the interstices of said solids intermittently received from said quenching chamber, an elongated solids conveyance and cooling conduit connected in solids receiving realtion to the bottom of said solids feeder means, means for passing a solids conveyance and cooling fluid concurrently through said conduit at a rate sufficient to convey and cool said solids therein, means for applying a thrust force against the solids discharging from the outlet of said conduit to maintain the solids moving therethrough as a dense upwardly moving mass having substantially the solids' static bulk density, means for disengaging said conveyance and cooling fluid from the discharged mass of solids, a solids heating chamber connected in solids receiving relation to said disengaging means for receiving a primary stream of said conveyed solids, means for passing a heating fluid therethrough, a solids cooling means connected in solids receiving relation to said disengaging means for receiving a secondary stream of said conveyed solids, conduit means for solids communicating the bottom of said heating chamber with the top of said reaction chamber, conduit means for solids communicating the bottom of said cooling means with the top of said quenching chamber, and conduit means for passing a reactant fluid indirectly through said cooling means to preheat said fluid communicating with said inlet opening into the top of said reaction chamber.

12. An apparatus for the high temperature contacting of fluids with a granular solid contact material which comprises a reaction chamber opening downwardly from its lower open end into the lower part of a quenching chamber, said quenching chamber surrounding said reaction chamber entirely, a solids inlet at the top of said reaction chamber, a solids inlet at the top of said quenching chamber, a reactant inlet opening into the top of said reaction chamber and an effluent outlet opening from the top of said quenching chamber whereby said reactant flows concurrently with said solids downwardly from said reaction chamber, into said quenching chamber, then laterally and then upwardly countercurrent to said solids therein to said effluent outlet, a mechanically sealable solids pressuring vessel connected at its upper end in solids-receiving relation with the bottom of said quenching chamber and provided with an upper solids surge chamber and a plurality of solids pressuring chambers each communicating in solids receiving relation with the bottom of said upper surge chamber through valved conduits and a lower solids surge chamber communicating in solids receiving relation through a valved conduit with the bottom of each of said pressuring chambers, a valved conduit for pressuring fluid opening into each of said pressuring chambers, instrument control means connected to and adapted for actuating the valves in said valved conduits in sequence to transfer solids in a substantially continuous stream into said lower solids surge chamber at an increased pressure therein, an elevated solids receiving vessel, an elongated conveyance conduit communicating the lower part of said lower surge chamber with said solids receiving vessel, the outlet of said conduit being disposed at said solids receiving vessel so as to restrict the discharge of the mass of solids therefrom to maintain said solids moving therethrough as a mass having substantially the solids' static bulk density, a primary solids transfer conduit opening downwardly therefrom into the top of a solids heating chamber, means for passing a heating fluid therethrough, a transfer conduit for solids communicating the bottom of said heating chamber with said solids inlet at the top of said reaction chamber, a secondary solids transfer conduit opening from said solids receiving vessel and communicating through a solids cooling means with said solids inlet at the top of said quenching chamber, a conduit for a fluid to be preheated opening into said lower surge chamber to flow and convey said solids through said elongated solids conveyance and cooling conduit, fluid-solids disengaging means in said solids receiving vessel for disengaging the preheated fluid from said solids, and conduit means for said preheated fluid opening therefrom into one of said chambers to contact the solids therein.

13. An apparatus according to claim 12 wherein said conduit means for preheated fluid opens from said fluid-solids disengaging means into said heating chamber, said solids conveyance and cooling fluid being a fuel for heating said solids therein.

14. An apparatus according to claim 12 in combination with conduit means for passing the reactant into and through said cooling means to form a partially preheated reactant, and a conduit for said partially preheated reactant communicating with said reactant inlet at the top of said reaction chamber.

15. An apparatus according to claim 14 wherein said conduit for said partially preheated reactant opens from said cooling means into said lower solids surge chamber for passage through said solids conveyance and cooling conduit to form a preheated reactant, and wherein said conduit opening from said fluid-solids disengaging means opens into said reactant inlet at the top of said reaction chamber.

References Cited in the file of this patent

UNITED STATES PATENTS

| | | |
|---|---|---|
| 2,490,336 | Crowley | Dec. 6, 1949 |
| 2,513,294 | Eastwood et al. | July 4, 1950 |
| 2,526,652 | Garbo | Oct. 24, 1950 |
| 2,548,286 | Bergstrom | Apr. 10, 1951 |
| 2,606,861 | Eastwood | Aug. 12, 1952 |
| 2,643,216 | Findlay | June 23, 1953 |
| 2,661,321 | Schutte | Dec. 1, 1953 |
| 2,673,786 | Alleman | Mar. 30, 1954 |
| 2,684,390 | Bills | July 20, 1954 |